United States Patent [19]
Lal et al.

[11] Patent Number: 5,576,085
[45] Date of Patent: Nov. 19, 1996

[54] THIN-FILM RECORDING MEDIUM WITH SOFT MAGNETIC LAYER

[75] Inventors: Brij B. Lal, San Jose; Tadashi Shinohara, Fremont, both of Calif.

[73] Assignee: HMT Technology Corporation, Fremont, Calif.

[21] Appl. No.: 148,651

[22] Filed: Nov. 1, 1993

[51] Int. Cl.$^6$ .................. G11B 5/66; B32B 3/02
[52] U.S. Cl. .................. 428/65.3; 428/336; 428/692; 428/694 T; 428/694 TS; 428/ 694 TP; 428/694 TC; 428/695; 428/900
[58] Field of Search .................. 428/694 T, 694 TS, 428/694 TP, 694 TC, 692, 695, 900, 336, 65.3

[56] References Cited

U.S. PATENT DOCUMENTS 5,041,922  8/1991  Wood et al. .................. 360/55
5,236,791  8/1993  Yahisa .................. 428/694 TP

FOREIGN PATENT DOCUMENTS 2072330  6/1992  Canada .

*Primary Examiner*—Leszek Kiliman
*Attorney, Agent, or Firm*—Judy M. Mohr; Peter J. Dehlinger

[57] ABSTRACT

A magnetic thin-film medium having improved magnetic recording properties, including an increased magnetic remanence and high frequency signal amplitude, is disclosed. The magnetic recording medium has a 10–100 Å soft ferromagnetic layer in addition to a substrate, a chromium underlayer, a thin-film magnetic recording layer and a protective overcoat.

4 Claims, 9 Drawing Sheets

THIN-FILM RECORDING MEDIUM WITH SOFT MAGNETIC LAYER

FIELD OF THE INVENTION

The present invention relates to a thin-film magnetic recording medium and to a method of producing the same.

BACKGROUND OF THE INVENTION

In conventional recording, data is written to a thin-film recording medium by a read-write transducer head which applies magnetic-flux signals to a high-coercivity thin film in a thin-film magnetic recording medium. The magnetic flux signals act to localize magnetic transitions in the medium, providing a stored form of the signals in the medium. In longitudinal recording, the read-write head has a longitudinally spaced gap for producing a magnetic flux in the direction of the plane of the medium, with the magnetic transitions in the medium being oriented also in the in-plane direction.

In the write mode, the oriented magnetic transitions provide localized magnetic fluxes which interact with a core in the read-write head, inducing a current in the core windings which can be amplified and "read" as a voltage-pulse signal. In a longitudinal recording, the flux lines in the oriented domains run substantially parallel to the plane of the medium.

In both recording and reproducing modes, flux losses occur which reduce the signal amplitude and storage density that can be achieved. One major source of flux loss is so-called spacing loss due to "uncaptured" flux in the spacing between the upper surface of the medium and the transducer head.

One approach to reducing spacing loss has been to reduce the distance between the surface of the medium and transducer head. This approach is limited by the problem of increased risk of collisions between the head and disc as the head is brought closer to the disc surface.

Another approach, disclosed in U.S. Pat. No. 5,041,992, uses a permeable magnetic layer, such as a permalloy layer, as a keeper layer to suppress spacing-loss flux. The keeper layer has a thickness between 300–1,000 Å. The approach uses a bias on the transducer head, typically a DC bias, to saturate the region of the keeper between the poles of the transducer head, which lowers the permeability of this region, producing a magnetically defined virtual gap between the upper surface of the magnetic thin film and the transducer head. The net effect is that the spacing above the magnetic layer in which magnetic flux loss occurs is largely blocked in the region corresponding to the traveling region between the two poles in the transducer head.

One limitation with this approach is the requirement for a bias on the transducer head, to saturate the traveling interpole region in the keeper layer. The patent notes that in the absence of a bias flux, virtually the entire flux from a given magnetic transition will tend to be confined to the magnetic saturable layer, so that little if any flux reaches the transducer head. Not all read-write heads which are commonly employed in hard drive systems are designed for applying a bias.

A second limitation is that the permeable keeper layer tends to distort the magnetic flux field imposed on the medium during a write operation, causing some loss of overwrite properties and recording density, particularly in view of the greater distance between the transducer head and thin-film recording layer.

It would therefore be desirable to achieve reduced spacing loss in a recording system of this type, without the requirement for a biased transducer head, and without magnetic flux distortions produced by a keeper layer.

SUMMARY OF THE INVENTION

In one aspect, the invention includes an improvement in a longitudinal magnetic recording medium for use with a zero-bias read-write head having (i) a substrate, (ii) a sputtered chromium underlayer, (iii) a sputtered thin-film magnetic recording layer, and (iv) a sputtered carbon overcoat. The improvement includes a sputtered soft ferromagnetic film about 10–100 Å in thickness disposed between the thin-film recording layer and the overcoat. The soft ferromagnetic layer is effective to increase the magnetic remanence of the medium.

Alternatively, or in addition, the soft ferromagnetic film is effective to enhance the high frequency amplitude response of the medium.

Other improved recording characteristics may also be achieved, such as an enhanced squareness ratio of the medium and a lower amplitude modulation of the medium.

The sputtered soft ferromagnetic film, in one embodiment, is composed of a nickel/iron alloy and has a thickness of between about 20–60 Å. Particularly when the film has a thickness of 20–40 Å additional improvements in bit-shift, overwrite, and DC-signal to noise ratio are observed.

The invention includes, in another aspect, a method of enhancing the magnetic remanence of a longitudinal recording medium of the type formed by sputtering onto a substrate, a chromium underlayer, a thin-film magnetic recording layer, and a carbon overcoat. The method includes sputtering between the magnetic recording layer and the carbon overcoat a soft ferromagnetic film to a film thickness of between 10–100 Å.

Alternatively, or in addition, the invention includes a method of enhancing the high frequency signal amplitude of a longitudinal recording medium, as measured at an outer diameter region of the medium using a zero-bias read-write head operating at 18 MHz. The medium is formed by sputtering as described in the paragraph above, where the soft ferromagnetic film is sputtered to a film thickness of between 10–100 Å.

More generally, the invention includes a method of reducing magnetic flux losses in a magnetic recording medium having a substrate, a sputtered chromium underlayer, a sputtered thin-film magnetic recording layer, and a sputtered carbon overcoat. The method includes sputtering onto the medium, a soft ferromagnetic layer having a thickness that is effective to enhance the high-frequency signal amplitude of the medium, as measured at an outer diameter region of the medium using a zero-bias read-write head operating at 18 MHz. The layer has a thickness of at least 10 Å, and preferably less than 100 Å.

In still another aspect, the invention includes a magnetic recording system. The system is composed of (i) the improved magnetic recording medium of the type described above, (ii) a means for rotating the medium, and (iii) a zero-bias read-write head.

The head is effective to read and write magnetic signals to the medium when positioned above the rotating medium. The system is characterized by a substantially higher magnetic remanence, as measured by vibrating sample magnetometry, when compared to the same system, but where the magnetic recording medium lacks the soft ferromagnetic film.

Alternatively, or in addition to, the system is characterized by an enhanced high frequency signal, as measured at an outer diameter region of the medium using a zero-bias read-write head operating at 18 MHz, again when compared to the same system, having a magnetic recording medium that lacks the soft ferromagnetic film.

These and other objects and features of the invention will be more fully appreciated when the following detailed description of the invention is read in conjunction with the accompanying drawings.

DETAILED DESCRIPTION OF THE DRAWINGS

I. Thin-Film Medium

Figure 1:
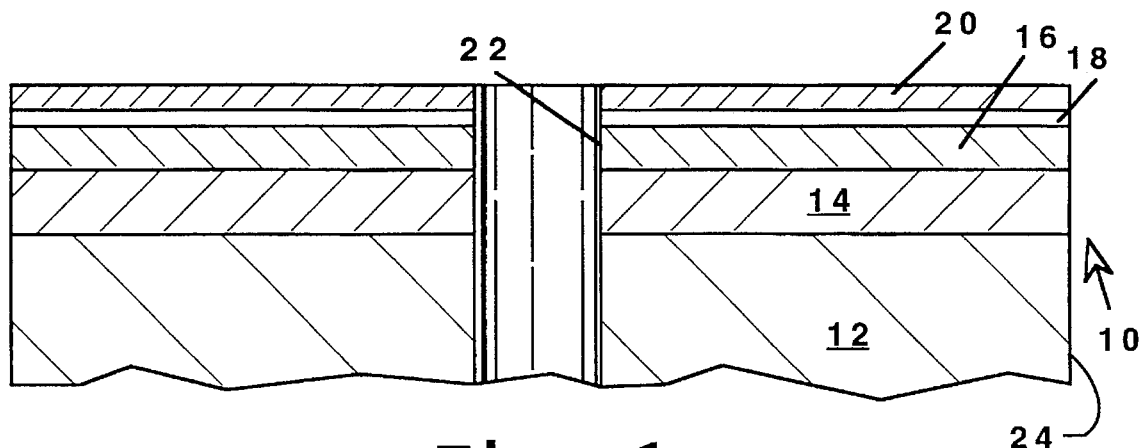
FIG. 1 is a sectional view of a thin-film magnetic recording medium formed in accordance with the invention.

FIG. 1 shows in cross sectional view, a fragmentary portion of a longitudinal thin-film medium or disc 10 formed in accordance with one embodiment of the invention. The disc generally includes a rigid substrate 12, and forming successive thin-film layers over the substrate, a crystalline underlayer 14, a magnetic thin-film layer 16, a thin, soft ferromagnetic layer 18, and a protective carbon overcoat 20. It will be appreciated that the disc is symmetrical with respect its upper and lower surfaces, the lower portion of the disc not being shown in the figure.

The substrate 12 may be a textured substrate, such as a conventional surface coated textured aluminum magnesium alloy base with an electroless-plated layer of nickel and phosphorus, or a textured glass, glass-ceramic, or ceramic substrate. An example of a glass-ceramic substrate is a canasite™ substrate available from Corning Glass (Corning, N.Y.). Such substrates typically have a thickness of about 1.27 mm for a 95 mm disc, and conventional testing is done at ID/OD values of about 0.8 inch and 1.78 inch, respectively. A non-metallic substrate may also include a metal sublayer, such as a Ti, Cr, or Cr-alloy sublayer.

Two conventional size substrates have outer diameters of 130 and 95 mm (5.1 and 3.74 inches), with corresponding inner diameters of 40 and 25 mm (1.57 and 0.98 inches), respectively. The discs used for the preferred embodiment of the present invention have inner diameters of 0.837 inches and outer diameters of 1.768 inches. The inner and outer edges of the disc which define these diameters are indicated at 22, 24, respectively, in FIG. 1.

The crystalline underlayer 14 is preferably a sputtered chromium underlayer having a thickness between about 100–3000 Å. Chromium containing alloys, such as CrV, CrGd and CrSi may also be suitable as the underlayer. Magnetic thin film recording properties are a function of chromium underlayer thickness, as will be discussed in Section II below.

Magnetic thin-film layer 16 is formed by sputtering onto the underlayer, a target alloy composed of a Co-based alloy such as a Co/Cr or Co/Ni binary alloy, or a Co/Cr or Co/Ni based alloy, i.e., an alloy in which the binary elements constitute about 80 atomic percent or more of the alloy. Exemplary alloys include Co/Cr/Ta, Co/Ni/Pt or Co/Ni/Cr ternary alloy, or a Co/Cr/Ta/Pt or Co/Ni/Ta/Pt quaternary alloy. One preferred magnetic thin film alloy is composed of 80–90 percent Co, 5–15 atom percent Cr, and 2–5 atom percent Ta. The magnetic thin-film layer has preferred thickness between about 100–800 Å, preferably 400–600 Å. These alloys are characterized by high-coercivity, high magnetic remanence, and low permeability, and are well-known for use in thin-film longitudinal recording media.

Film 18 is formed of a ferromagnetic material, such as iron, nickel, or an iron/nickel alloy, such as permalloy, or iron-aluminum alloy. The material is characterized by high magnetic permeability, preferably greater than about 1,000, and low coercivity, preferably less than 1 Oe. The soft magnetic layer has a thickness of at least 10 Å, but preferably less than 100 Å. As will be seen below, this thickness range, and preferably a thickness range between about 20–60 Å, is effective to increase the high-frequency signal amplitude of the medium, as measured with a zero-bias read-write head, and also significantly enhances the magnetic remanence (expressed as $M_r t$) of the medium.

In another embodiment (not shown), the thin ferromagnetic layer is sputtered onto the substrate, directly below the Cr underlayer. Since the Cr underlayer has a high magnetic permeability, the ferromagnetic layer in this embodiment also functions to limit magnetic field lines below the magnetic thin-film layer, similar to that described in Section IV for the ferromagnetic layer disposed above the magnetic thin film.

Carbon overcoat 20 in the thin-film medium is preferably a carbon layer formed by sputtering carbon onto the magnetic layer, under conditions in which the carbon is in a predominantly diamond-like structure. The overcoat thickness is preferably between about 100 and 300 Å.

II. Method of Producing the Medium

Figure 2:
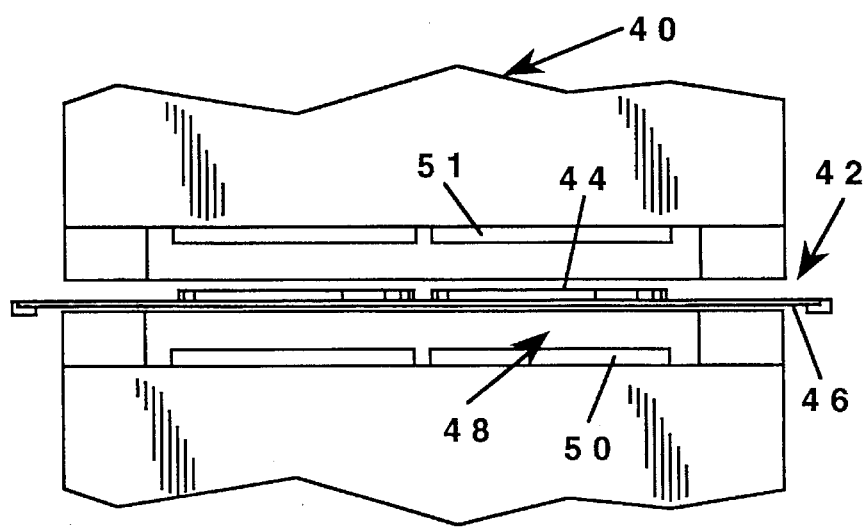
FIG. 2 is a schematic view of a sputtering apparatus used in producing the thin-film medium of the invention.

FIG. 2 shows, in schematic view, a portion of a sputtering apparatus 40 which is used, in the method of the invention, for producing the thin-film medium described in Section I. The method will be described with reference to forming the medium illustrated in FIG. 1.

Apparatus 40 includes a vacuum chamber 42 having at least four stations at which sputtering or heating operations occur. A heating station (not shown) at the upstream end of the chamber has a plurality of infrared lights which are arrayed for heating both sides of a substrate, such as substrate 44, carried through the station in the chamber on an disc holder or pallet 46.

Just downstream of the heating station is a first sputtering station 48 at which the chromium underlayer is formed on a substrate, in a manner to be described. The station includes a pair of targets, such as target 50, effective to sputter chromium onto opposite sides of a substrate. The targets in station 48 are preferably pure chromium targets, or chromium alloys containing predominately chromium.

A second sputtering station (not shown) downstream of chamber 48 is used for sputtering the magnetic thin-film layer over the underlayer. The targets used at this sputtering station have a selected Co-based alloy composition noted above suitable for forming a thin-film magnetic recording layer.

A third sputtering station (not shown), also like station 48, provides targets for sputtering the thin, soft ferromagnetic layer over the magnetic thin-film layer. The targets in this station are formed of the ferromagnetic material discussed above. According to an important feature of the method of the invention, the soft ferromagnetic layer is sputtered to a thickness which is effective to enhance the high-frequency signal amplitude of the medium, measured as described in Section III below, using a zero-bias read-write head, that is, a head which is operated without a DC bias source or other bias that would be effective to saturate the localized region of the ferromagnetic layer between the poles of the read-write head (see Section IV below).

A thickness of at least 10 Å for the ferromagnetic layer is sputtered. The data discussed in Section III below show that layer thicknesses up to about 60 Å are effective to enhance high-frequency signal amplitude in the disc. Greater layer thickness, preferably no greater than about 100 Å, may also be employed. As will be seen below, the effect of the ferromagnetic layer on measured signal amplitude will depend on chromium layer thickness and ferromagnetic layer thickness, and also on the alloy composition and thickness of the magnetic thin-film layer.

For any given underlayer thickness, and magnetic-thin-film layer, the effect on high-frequency signal amplitude, as a function of the thickness of the ferromagnetic layer, for example in the 10–150 Å range, can be readily determined by the approach discussed in Section III, which shows the effect on signal amplitude of a ferromagnetic film having a thickness up to 60 Å. Once this calibration curve is established, the ferromagnetic layer thickness can be sputtered to a selected thickness. As will be seen with reference to FIG. 13 discussed below, the signal amplitude peaks in the range between 10–100 Å, then falls with increasing layer thickness above this range. Methods for controlling the thickness of sputtered films in a conventional sputtering apparatus are well known.

The carbon overcoat in the medium is produced by sputtering from a graphite target in a final sputtering station (not shown) in the apparatus.

The basic sputtering apparatus is preferably a commercial system, such as in available from Varian (Santa Clara, Calif.), Circuits Processing Apparatus (Fremont, Calif.), ULVAC (Japan), Leybald Heraeus (Germany), VACTEC (Boulder, Colo.), or Materials Research Corporation (Albany, N.Y.). These systems are double-sided, in-line, high-throughput machines having two interlocking systems, for loading and unloading.

In operation, the sputtering chamber is evacuated to pressure of about $10^{-7}$ Torr, and argon gas is introduced into the chamber to a final sputtering pressure of 2–20 mTorr.

The substrate is heated in the heating station to a selected temperature before advancing into the sputtering chambers. The heating conditions in the apparatus are preferably adjusted to achieve a preferred substrate temperature of between about 100° C. and 300° C., although temperatures below 100° C. may also be employed.

The heated substrate is moved into the first sputtering station and the chromium underlayer is sputtered onto the textured disk surface. It is desirable that the chromium layer be deposited so that it has a high anisotropic parallel/perpendicular crystal orientation ratio. This anisotropy is important in establishing desired magnetic properties. Sputtering voltage and deposition rates which favor the formation of anisotropy are known to those skilled in the art.

The chromium underlayer is deposited to a thickness of between about 100–3000 Å. The thickness is controlled by conventional sputter deposition parameters, such as sputter pressure, target power, voltage, deposition time, etc. These parameters are adjusted, conventionally, to achieve the desired underlayer thickness. As will be seen in Section III below, the magnetic recording properties, such as HF and LF signal amplitude, bit shift, overwrite and signal to noise ratio vary according to the thickness of the chromium underlayer.

After formation of the underlayer, the substrate is moved downstream on a disc holder into the second sputtering chamber, where the thin film magnetic recording layer is sputtered onto the underlayer. The magnetic recording layer is sputtered onto the underlayer under conditions similar to those described above. The thickness of the thin-film magnetic recording layer is preferably between about 100–800 Å, and more preferably 400–800 Å.

The substrate is moved downstream on a disc holder into the next sputtering chamber, where the soft ferromagnetic layer is sputtered onto the thin-film magnetic recording— layer. The soft ferromagnetic thin film is sputtered at a pressure and temperature similar to those specified above for formation of the magnetic recording layer. The thickness of the soft ferromagnetic layer is preferably between about 10–100 Å, and more preferably 20–60 Å.

The substrate is then carried on the disc holder toward another sputtering station where a carbon overcoat is applied according to conventional sputtering methods.

III. Media Properties

Bulk magnetic properties were determined by vibrating sample magnetometry (VSM) conventionally. Magnetic recording testing was carried out on a zero-bias Guzik Model RWA 221, using a thin-film inductive reading and recording head with a gap length of 14 μin., a gap width of 472 μin., and a flying height of 4.5 μin. The head inductance was 1.1μHenry and resistance, 30 ohms. Recording current was 25–30 Mamps for saturation. The AC-SNR was measured at linear densities between 750 and 2600 flux change/mm.

In the studies reported below, media were prepared as follows: An aluminum substrate (with a nickel/phosphorus coating) (95 mm) was heated to 270° C., and a sputtered Cr sublayer having a thickness of either 300 Å or 1200 Å was deposited. The coated substrate was positioned in a second sputtering station to form a CoCrTa thin-film magnetic recording layer. A soft ferromagnetic film of NiFe was then sputtered onto the magnetic recording layer, to a selected thickness, followed by a 250 Å carbon overcoat.

Figure 3:
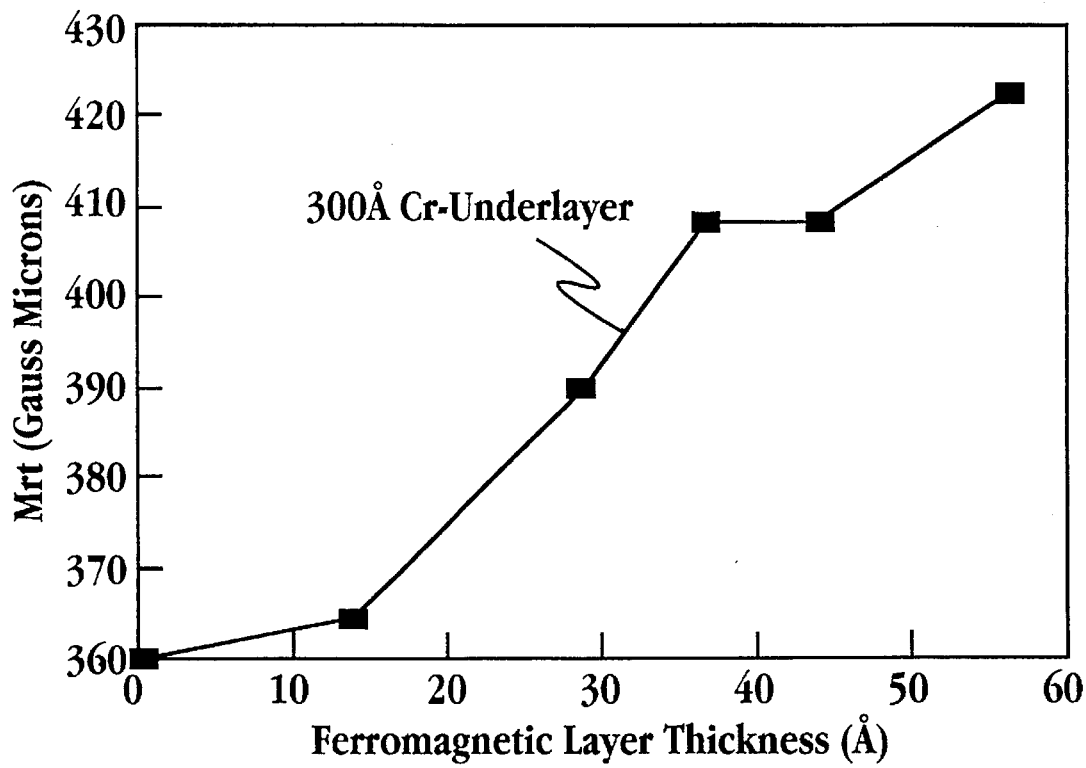
FIG. 3 is a plot of magnetic remanence, in Gauss microns, as a function of thickness of the soft ferromagnetic layer, in Å.

FIG. 3 shows the effect of thickness of the soft NiFe ferromagnetic layer on magnetic remanence, expressed as $M_r t$. Above about 10 Å, $M_r t$ increases with increasing thickness of the ferromagnetic layer, up to the greatest layer thickness tested. At a layer thickness of about 55 Å, $M_r t$ was enhanced about 18% over a conventional medium, i.e., one lacking a thin, ferromagnetic film.

Figure 4:
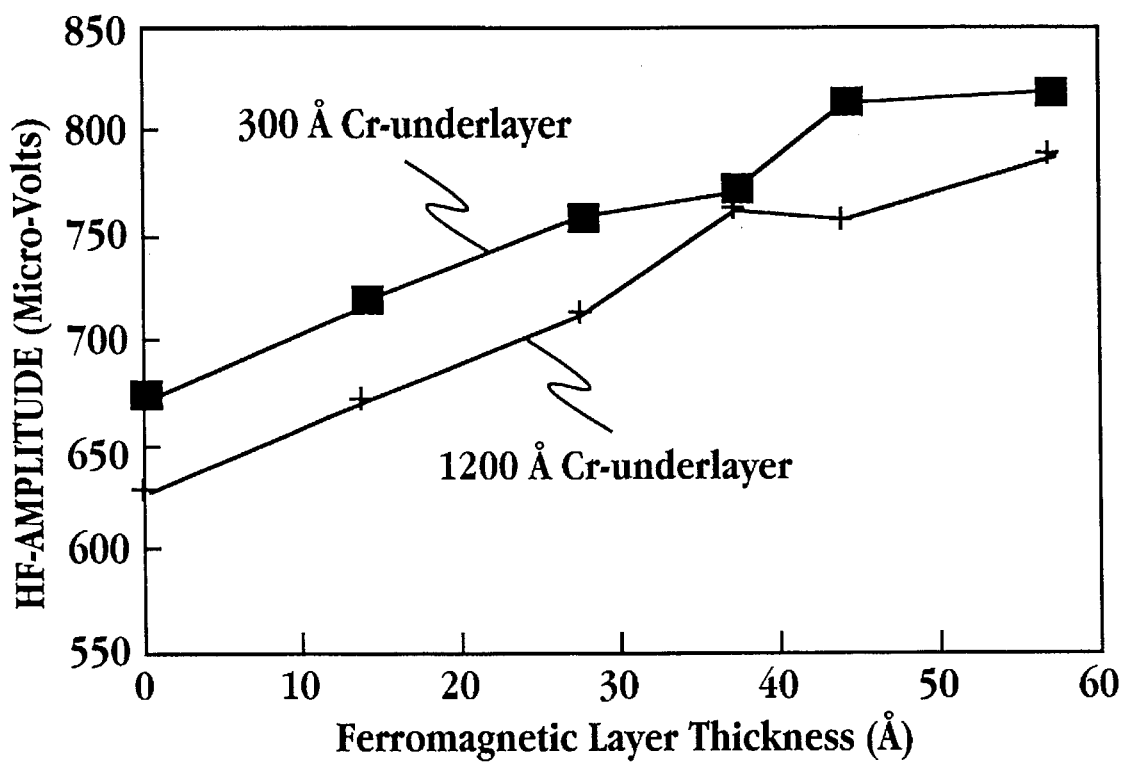
FIG. 4 is a plot of high frequency signal amplitude measured in micro-volts as a function of thickness of the soft ferromagnetic layer in Å where the chromium underlayer is 300 Å (closed rectangles) and 1200 Å (+ symbols)

The increase in high frequency signal amplitude with increasing thickness of the soft NiFe ferromagnetic layer is shown in FIG. 4. The solid rectangles correspond to a media prepared with a 300 Å chromium underlayer and the "+ symbols" to a 1200 Å underlayer. For both underlayer thicknesses, HF signal amplitude was enhanced about 20–25% at the greatest layer thickness.

Figure 5:
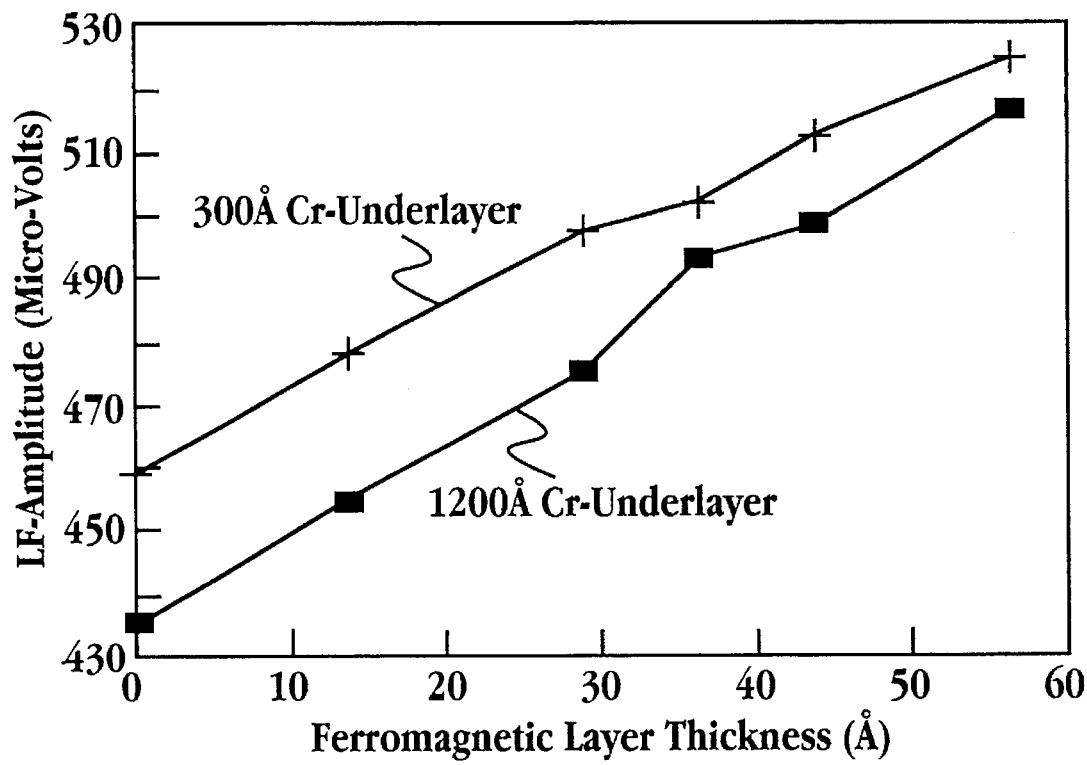
FIG. 5 is a plot of low frequency signal amplitude measured in micro-volts as a function of thickness of the soft ferromagnetic layer in Å where the chromium underlayer is 300 Å (closed rectangles) and 1200 Å ("+" symbols)

A similar plot for low frequency amplitude is shown in FIG. 5, where the thin ferromagnetic layer increases low frequency signal amplitude by about 15–20% at the greatest layer thicknesses measured.

Figure 6:
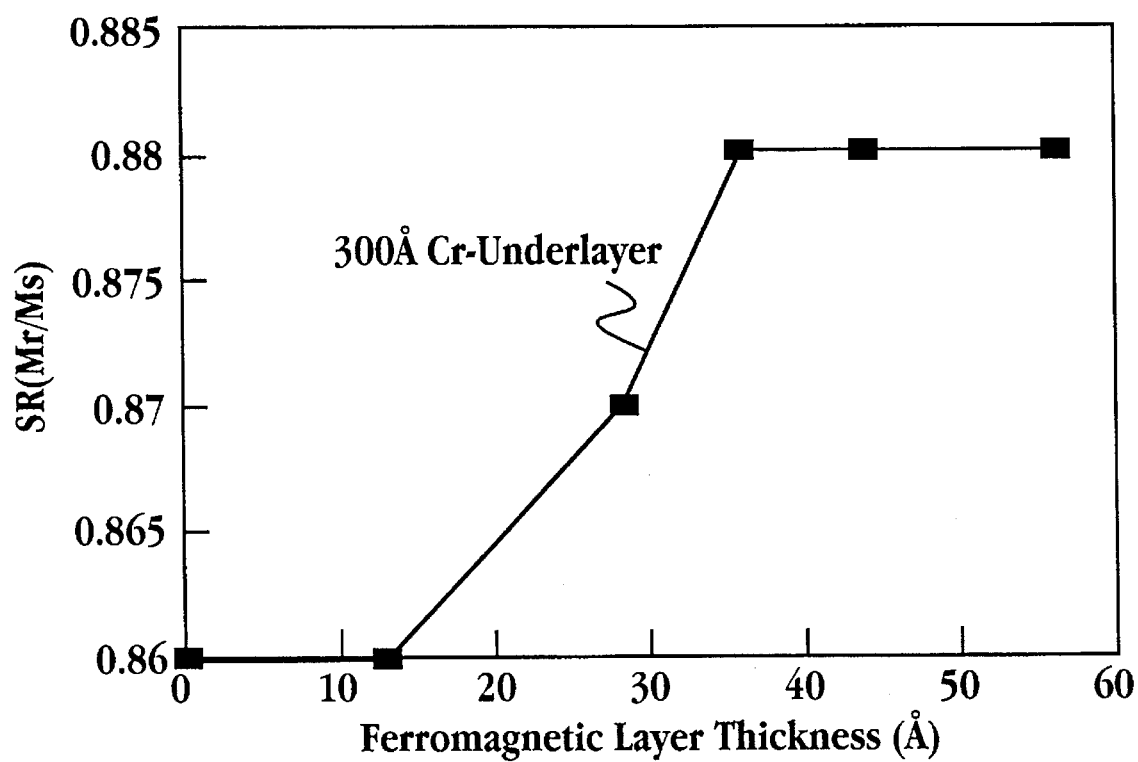
FIG. 6 is a plot of squareness ratio as a function of thickness of the soft ferromagnetic layer, in Å.

FIG. 6 is a plot of squareness ratio, determined from a conventional M-H hysteresis loop from the ratio of Mr/Ms. There is a small improvement in SR between about 15–32 Å.

Figure 7:
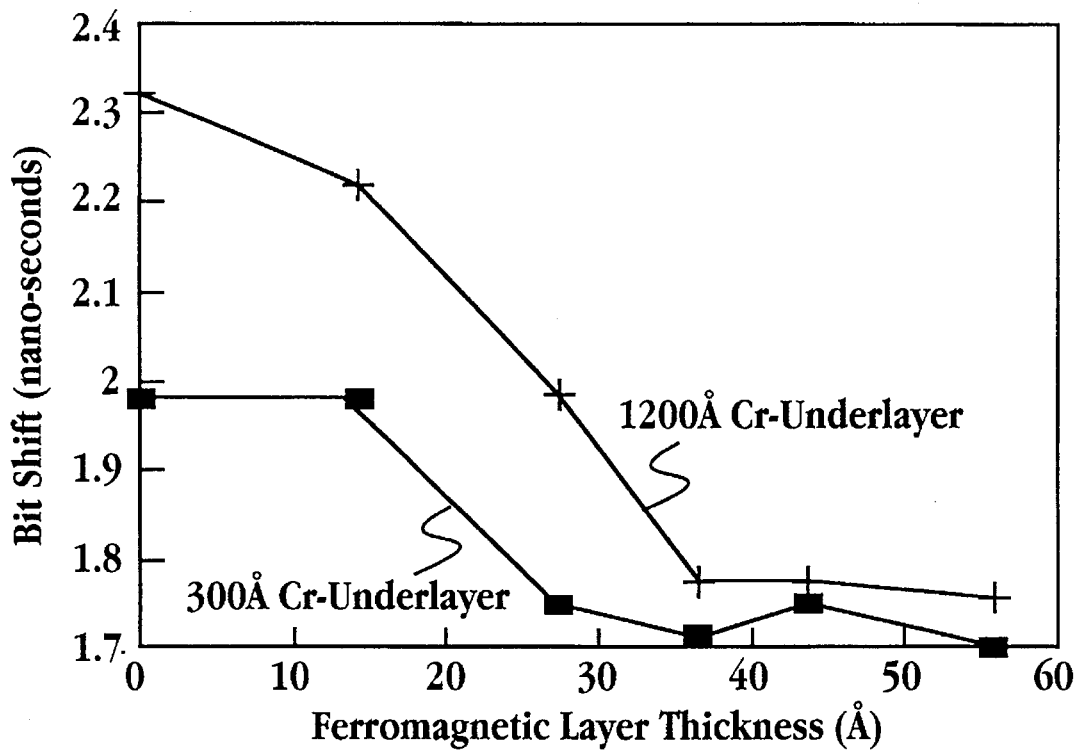
FIG. 7 is a plot of bit shift, in nanoseconds, as a function of thicknesses of the soft ferromagnetic layer, in Å, where the chromium underlayer is 300 Å (closed squares) and 1200 Å (+ symbols)

The decrease in bit shift with increasing NiFe ferromagnetic film thickness is shown in FIG. 7. When the chromium underlayer is 300 Å (closed squares) the bit shift is reduced from approximately 2 to 1.7 as the thickness of the NiFe magnetic layer goes from 0 (no NiFe film present) to 55 Å. A more pronounced reduction is observed when the chromium underlayer is 1200 Å ("+ symbols"), where the bit shift is just over 2.3 with no soft NiFe ferromagnetic layer and decreases to under 1.8 when a soft ferromagnetic film of greater than 35 Å is deposited.

Figure 8:
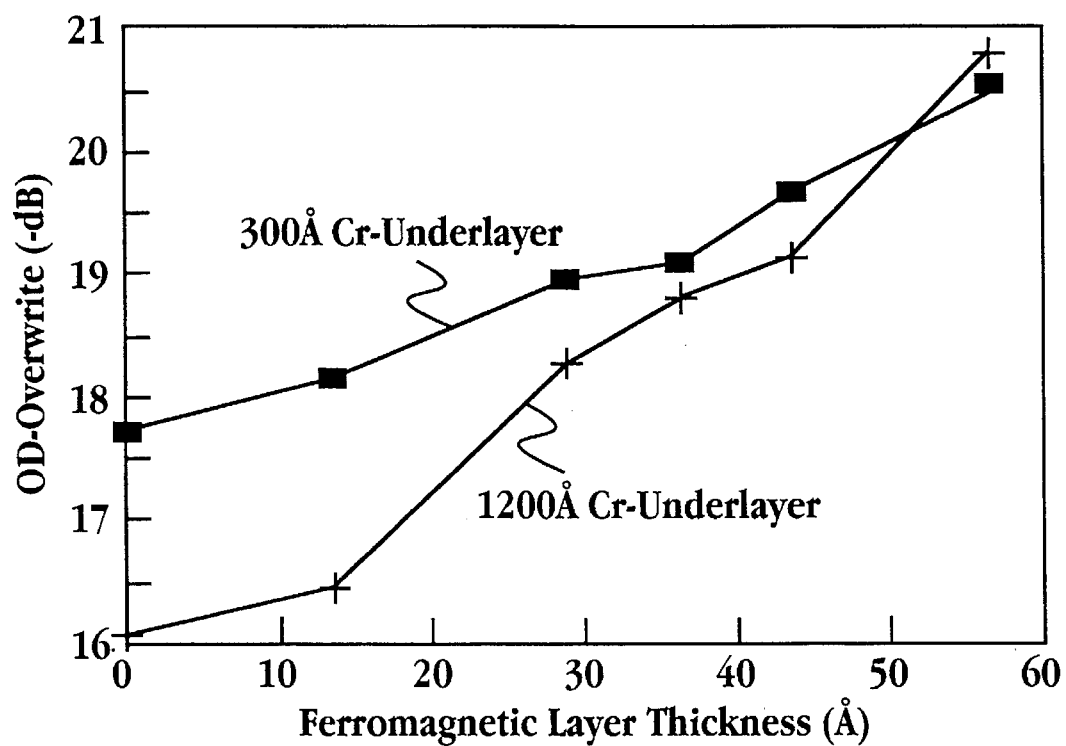
FIG. 8 is a plot of overwrite, in –dB, as a function of thickness of the soft ferromagnetic layer, in Å, where the chromium underlayer is 300 Å (closed squares) and 1200 Å (+ symbols)

FIG. 8 shows the change in overwrite properties as a function of thickness of the soft NiFe ferromagnetic film at two thickness of chromium underlayer, 300 Å and 1200 Å. The overwrite increases 29% for a magnetic media with a chromium underlayer of 1200 Å ("+ symbols") over the range of ferromagnetic layer thickness between 0–56 Å, and about 17% over the same range at an underlayer thickness of 300 Å.

Figure 9:
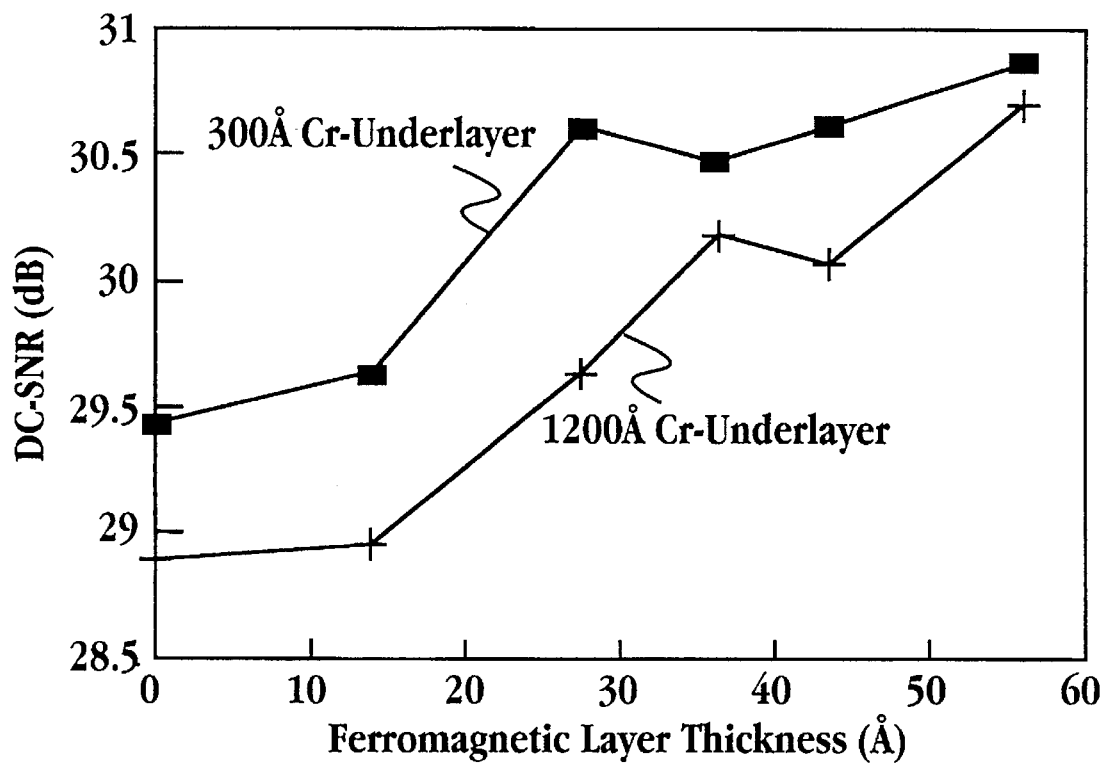
FIG. 9 is a plot of DC-signal to noise ratio, in –dB, as a function of thickness of the soft ferromagnetic layer, in Å, where the chromium underlayer is 300 Å (closed squares) and 1200 Å (+ symbols)

The effect of increasing thickness of soft NiFe ferromagnetic film thickness on the DC-signal to noise ratio is shown in FIG. 9. Measurements were made at chromium underlayer thicknesses of 300 Å and 1200 Å and a very pronounced effect on the signal to noise ratio is observed when the chromium underlayer is 1200 Å ("+ symbols") and the soft ferromagnetic film increases in thickness from 10–60 Å.

Figure 10A:
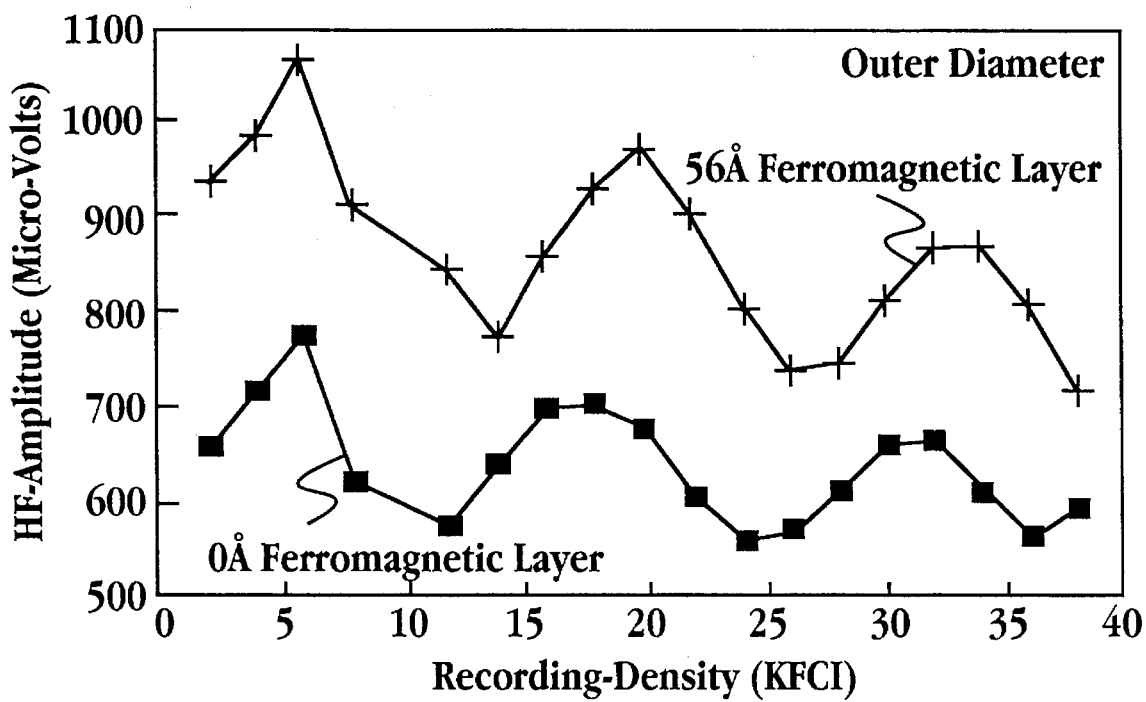
FIG. 10A is a plot of HF signal amplitude measured at the outer diameter of the disc in micro-volts as a function of recording density in KFCI, where the soft ferromagnetic layer is absent (closed squares) and is 56 Å (+ symbols)
Figure 10B:
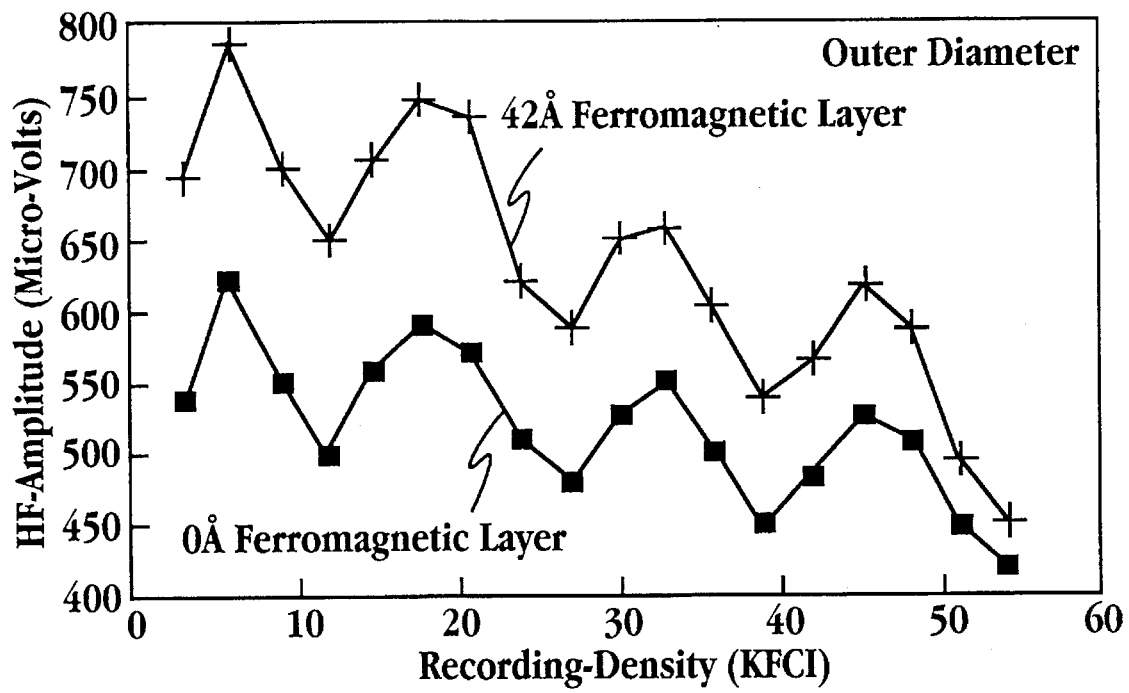
FIG. 10B is a plot of HF signal amplitude measured at the outer diameter of the disc in micro-volts as a function of recording density in KFCI, where the soft ferromagnetic layer is absent (closed squares) and is 42 Å (+ symbols)
Figure 10C:
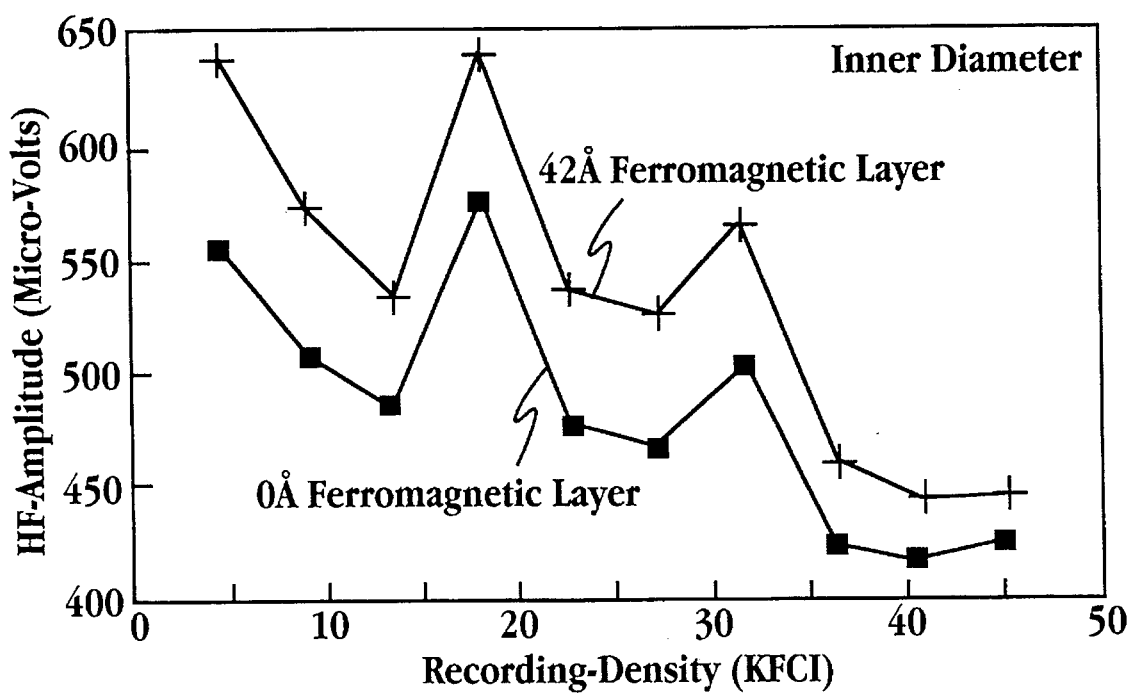
FIG. 10C is a plot of HF signal amplitude measured at the inner diameter of the disc in micro-volts as a function of recording density in KFCI, where the soft ferromagnetic layer is absent (closed squares) and is 42 Å (+ symbols)

FIGS. 10A and 10B are plots of high frequency amplitude measured at the outer diameter of the recording medium when the soft ferromagnetic layer is 56 Å (FIG. 10A) or 42 Å (FIG. 10B) as a function of recording density in kiloflux changes/in. FIG. 10C is a similar plot where the medium has a 42 Å soft NiFe ferromagnetic film, and the high frequency signal amplitude was measured at the inner diameter of the medium. In all three plots, for comparison, the high frequency amplitude of a recording medium with no NiFe soft ferromagnetic layer is shown in solid rectangles. It is clear that at both the inner and outer diameters the presence of a soft NiFe ferromagnetic film gives increased high frequency signal amplitude, relative to the medium with no soft ferromagnetic layer.

Figure 11:
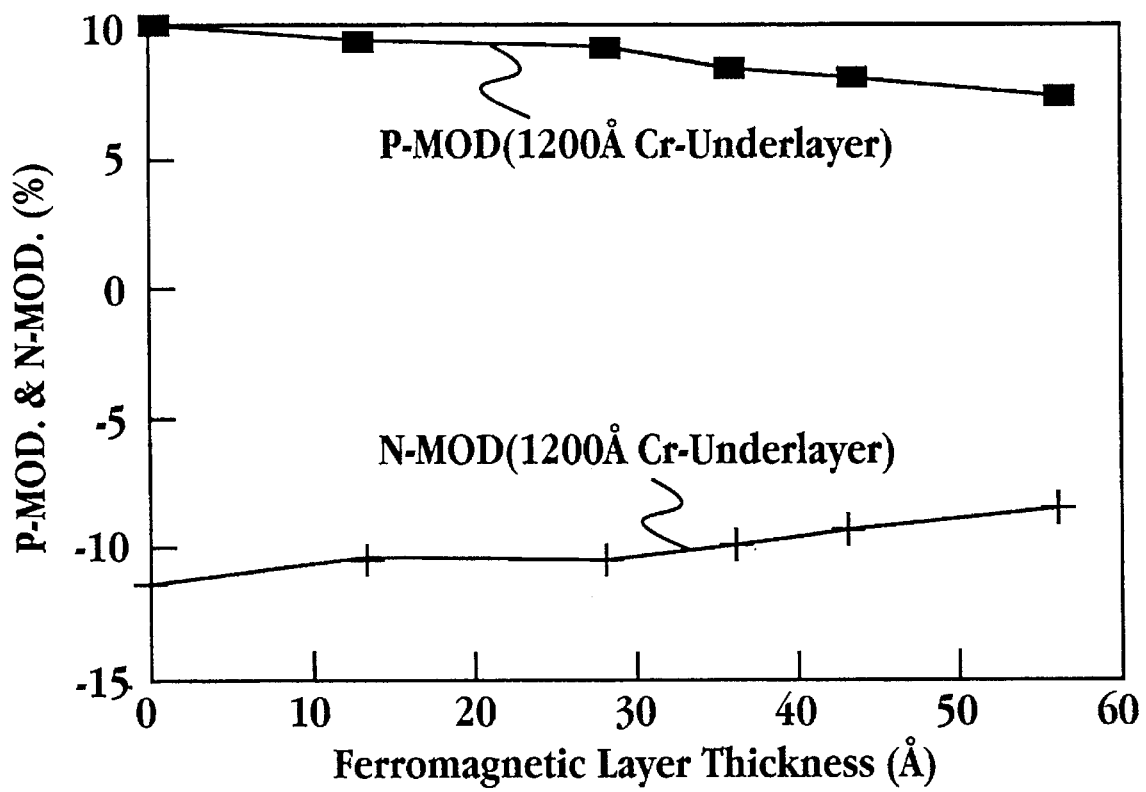
FIG. 11 is a plot of positive-modulation and negative-modulation in per cent as a function of thickness of the soft ferromagnetic layer in Å.

FIG. 11 is a plot of positive-modulation (P-mod) and negative-modulation (N-mod) as a function of thickness of the soft NiFe ferromagnetic layer. The decrease in P-mod and N-mod achieved at 56 Å is about 3–5%.

Table 1 summarizes the effect of a soft NiFe magnetic layer thickness on outer diameter parametrics for media prepared with a 300 Å and a 1200 Å thick chromium layer. The increase in high frequency amplitude, overwrite, and the decrease in bit shift are also illustrated in FIGS. 4, 7 and 8, respectively. The signal resolution (res.) decreases slightly, as the change in high frequency is more pronounced than the change in low frequency. PW-50, or the isolated readback pulse width measured at 50% of base to peak amplitude, increases somewhat as a function of increasing thickness of the soft ferromagnetic film layer. This reduction is desirable, as for high density recording, PW-50 should be reduced.

TABLE 1

Effect Of NiFe Soft Ferromagnetic Layer On Recording Parametrics.
Thin-Film Media: Substrate/Cr/CoCrTa/NiFe/Overcoat

| EXPT# | BH-Hc (Oe) | NiFe | OD: R = 1.77" (HF: 18 MHz) | | | | | |
|---|---|---|---|---|---|---|---|---|
| | | | HF (uV) | RES. (%) | OW (−dB) | PW50 (ns) | BS (ns) | SNR (dB) |
| NEW MEDIA: Cr: 300Å | | | | | | | | |
| #3A | 1821 | 0 | 677 | 96.3 | 17.7 | 29.1 | 2.0 | 29.4 |
| #3B | | 14Å | 717 | 96.4 | 18.2 | 29.2 | 2.0 | 29.6 |
| #3C | | 28Å | 756 | 94.0 | 19.0 | 29.4 | 1.8 | 30.6 |

TABLE 1-continued

Effect Of NiFe Soft Ferromagnetic Layer On Recording Parametrics.
Thin-Film Media: Substrate/Cr/CoCrTa/NiFe/Overcoat OD: R = 1.77" (HF: 18 MHz)

| EXPT# | BH-Hc (Oe) | NiFe | HF (uV) | RES. (%) | OW (−dB) | PW50 (ns) | BS (ns) | SNR (dB) |
|---|---|---|---|---|---|---|---|---|
| #3D | | 36Å | 773 | 92.6 | 19.1 | 29.8 | 1.7 | 30.4 |
| #3E | | 42Å | 813 | 93.5 | 19.7 | 29.9 | 1.8 | 30.7 |
| #3F | | 56Å | 821 | 89.6 | 20.6 | 30.8 | 1.7 | 30.8 |
| NEW MEDIA: Cr: 1200Å | | | | | | | | |
| #4A | 1938 | 0 | 624 | 96.3 | 16.1 | 29.3 | 2.3 | 28.7 |
| #4B | | 14Å | 678 | 97.0 | 16.4 | 29.0 | 2.2 | 28.9 |
| #4C | | 28Å | 713 | 93.2 | 18.2 | 29.5 | 2.0 | 29.6 |
| #4D | | 36Å | 760 | 96.4 | 18.8 | 29.8 | 1.8 | 30.2 |
| #4E | | 42Å | 754 | 90.7 | 19.2 | 30.3 | 1.8 | 30.2 |
| #4F | | 56Å | 784 | 89.3 | 20.8 | 30.6 | 2.0 | 30.7 |

IV. Method of Reducing Flux Loss

A method of reducing magnetic flux losses in a magnetic recording medium formed in accordance with this invention will be discussed in relation to FIG. 12. The method includes sputtering onto a medium having a substrate, a sputtered chromium underlayer, a sputtered thin-film magnetic recording layer, and a sputtered carbon overcoat, a soft ferromagnetic layer having a thickness that is effective to enhance the high-frequency signal amplitude of the medium, as measured at an outer diameter region of the medium using a zero-bias read-write head operating at 18 MHz. The layer has a thickness of at least 10 Å.

Figure 12A:
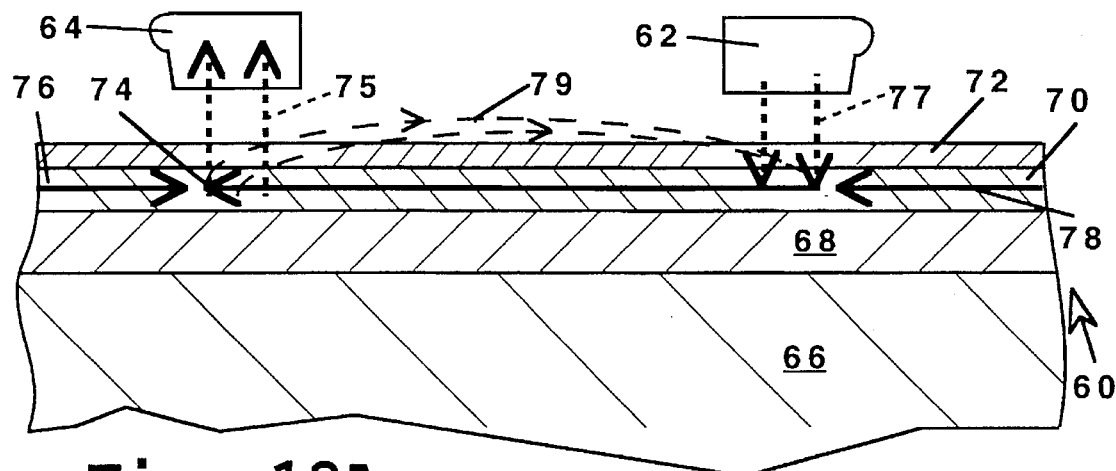
FIG. 12A shows a conventional medium, FIG. 12B, a medium constructed according to the present invention, and having a thin, soft ferromagnetic layer, and 12C, a medium having a thick, soft ferromagnetic layer.
Figure 12B:
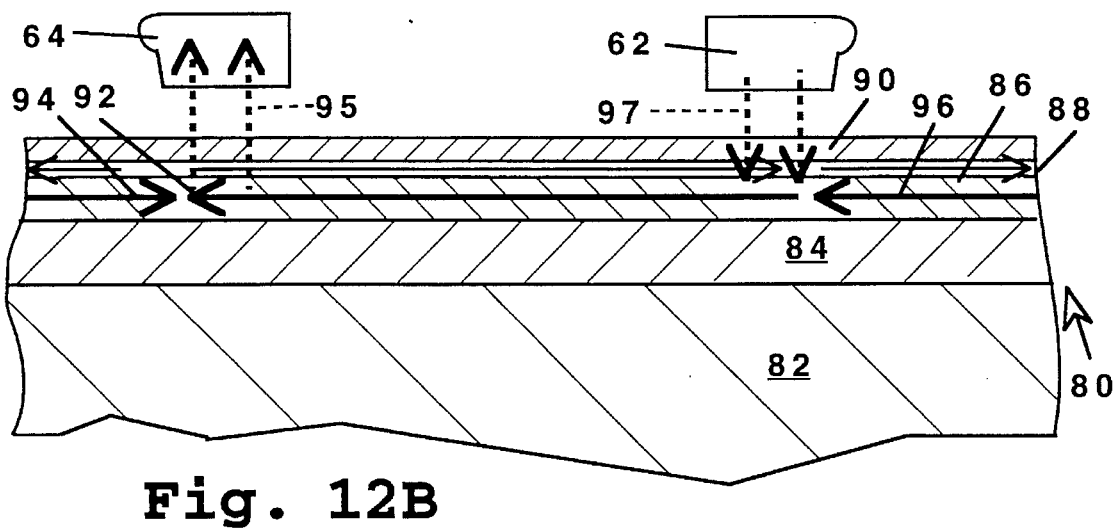
FIGS. 12 A–C are cross-sectional views of a region in a thin-film magnetic recording media, showing a magnetic transition region and poles in a read-write head used in detecting the stored magnetic signal in the transition region, where
Figure 12C:
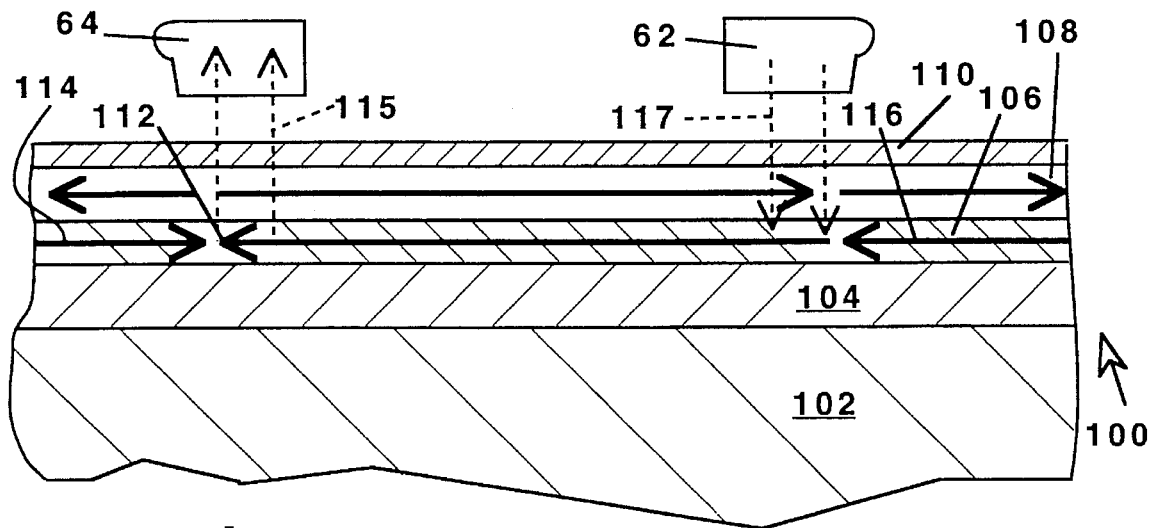

FIGS. 12A–C illustrate how the soft ferromagnetic layer functions to reduce the spacing flux losses during the read-write process, which results in the improved recording characteristics shown in Section III above.

FIG. 12A shows a transition region in a conventional thin-film medium 60 and the two poles 62, 64 of a zero-bias read-write head (not shown) used in reading data stored in the form of magnetic transitions on the medium.

The medium includes a substrate 66, a chromium underlayer 68, a thin-film magnetic recording layer 70 and a carbon overcoat 72, and is similar to medium 10 of FIG. 1, but lacks the thin soft ferromagnetic layer. Seen here is a transition region, indicated by arrow 74 which shows the alignment of magnetic dipoles in the transition region. Also shown are two adjacent regions in which the arrows 76, 78, also indicate the alignment of magnetic dipoles in their respective transition regions.

As seen, aligned magnetic dipoles forming the region produce magnetic flux lines 79 extending above the medium surface between the two poles of the transducer head.

In a reading operation, the magnetic recording medium rotates below the transducer head, and the magnetic field in each transition region interacts with the spaced poles 62, 64, as indicated by dark dotted lines 75, 77 to induce a current in coil windings present in the transducer head, giving the signal. The flux 79 due to spacing loss is not "captured" by the transducer head during the reading operation, reducing the signal amplitude.

FIG. 12B shows a transition region in a thin-film medium 80 according the present invention. As in FIG. 12A, two poles 62, 64 of a zero-bias read-write head (not shown) used in reading data stored in the form of magnetic transitions on the medium are also shown.

The medium of FIG. 12B includes a substrate 82, a chromium underlayer 84, a thin-film magnetic recording layer 86, a thin, soft ferromagnetic layer 88, and a carbon overcoat 90. Seen here is a transition region, indicated by arrow 92, which shows the alignment of magnetic dipoles in the transition region. Also shown are two adjacent regions in which the arrows 94, 96, also indicate the alignment of magnetic dipoles in the respective transition regions.

A portion of the signal flux due to magnetic alignment in the transition region, indicated by arrow 92, is shunted by the soft ferromagnetic layer 88, as indicated by the arrows in layer 88. The portion of flux shunted by the soft ferromagnetic layer is sufficient to saturate the layer, resulting in a reduced permeability of this layer, thus limiting further magnetic flux in the ferromagnetic layer. Because of this saturation of the layer, magnetic flux from the transition region of the magnetic thin film is effectively confined to the thin-film layer, and spacing losses are reduced. This reduced spacing loss may contribute, along with the increased $M_r t$ of the medium, to the greater signal amplitude observed in the medium.

In addition, flux lines which are seen by the read-write head, indicated in FIG. 12B as 95, 97, are better defined at the two poles of the transition region, since stray spacing-loss flux has been reduced or eliminated. The more sharply defined magnetic lines seen by the head may be responsible, at least in part, for the higher overwrite and lower bit-shift observed in the medium.

FIG. 12C shows the effect on signal amplitude as the thickness of the ferromagnetic layer in increased significantly, e.g., beyond 100 Å. Here the medium 100 includes a substrate 102, a chromium underlayer 104, a thin-film magnetic recording layer 106, a thick, soft ferromagnetic layer 108, and a carbon overcoat 110. Arrow 112 in FIG. 12C indicates a transition region, similar to region 92 in FIG. 12B, with arrows 114, 116 indicating the alignment of magnetic dipoles in adjacent transition regions.

As in the FIG. 12 medium, magnetic flux from the transition region is shunted into the adjacent overlying region of the ferromagnetic layer. However, because of the thickness of the layer, the flux from the transition layer is unable to saturate the adjacent ferromagnetic-layer region, or is able to saturate this region to only at a high flux level, effectively shunting all or most of the transition signal into the overlying layer. As a result, the magnetic flux seen by the transducer head is significantly reduced or eliminated, as indicated by the light dotted arrows at 115, 117.

Figure 13:
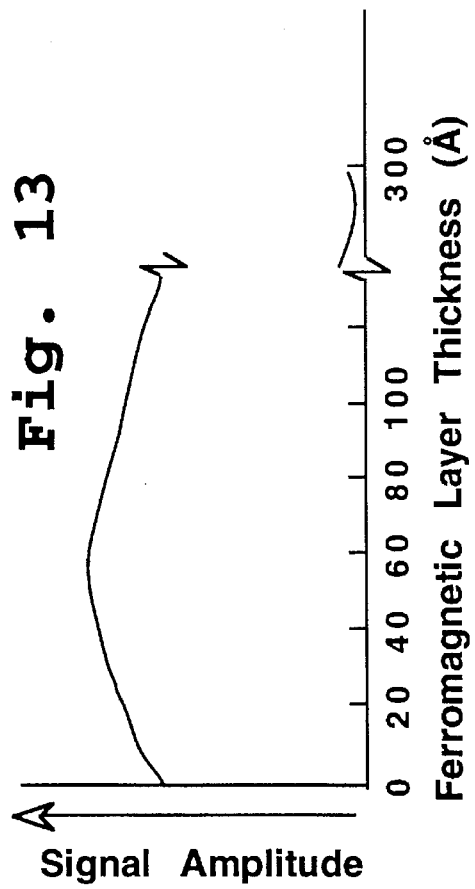
FIG. 13 shows the relationship between signal amplitude and thickness of a ferromagnetic layer, such as shown in FIGS. 12B and 12C.

As the thickness of the ferromagnetic layer is increased, the transition region flux is reduced, then effectively eliminated, as shown in FIG. 13. At such a thickness of the ferromagnetic layer, it is necessary to apply a bias on the read-write head (to saturate the ferromagnetic region between the transition poles) in order to read the magnetic transitions in the medium. As noted above, the present invention contemplates eliminating or reducing spacing loss without the need for head bias. At the same time, the thin ferromagnetic layer in the medium is effective to enhance $M_r t$ significantly, also contributing to higher signal amplitude.

Another advantage of a thin ferromagnetic film is that it minimizes the additional distance between the read-write head and the magnetic thin film, thus allowing higher recording density.

V. Magnetic Recording System

Figure 14:
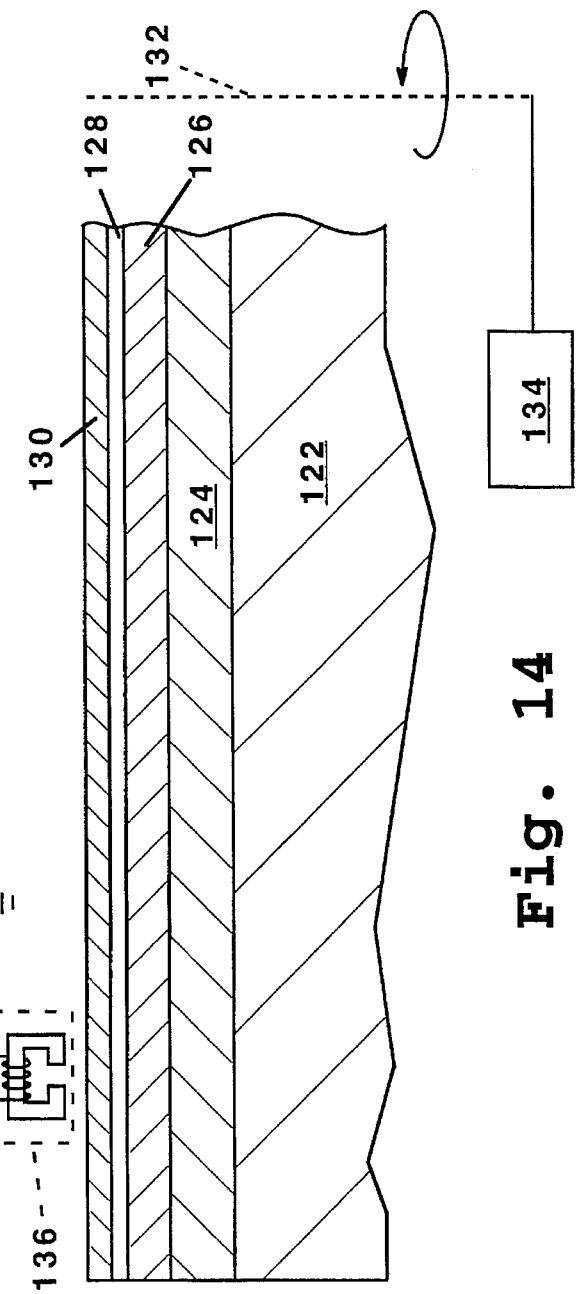
FIG. 14 illustrates components in a system for recording and reproducing magnetic signals, in accordance with the invention.

FIG. 14 shows a magnetic recording system having a magnetic recording medium similar to that described in FIG. 12B. The medium includes a substrate 122, a chromium underlayer 124, a thin-film magnetic recording layer 126, a thin, soft ferromagnetic layer 128, and a carbon overcoat 130.

The medium is mounted on a spindle 132 which has a means 134 to drive the spindle. The magnetic recording medium thus rotates beneath a zero-bias magnetic transducer head 136. The transducer has a coil winding 138 for carrying the signal current to appropriate instruments 140 for amplification and processing.

In use, a region in the soft ferromagnetic layer 128 between the poles of the transducer head is saturated by a portion of the flux emanating from the stored magnetic transitions in the thin-film magnetic recording layer 126. The saturated region reduces the spacing loss, and as a result the signal amplitude is increased.

Although the invention has been described with respect to particular embodiments, it will be apparent to those skilled in the art that various changes and modifications can be made without departing from the invention.

It is claimed:

1. A magnetic recording system, comprising;

a magnetic recording medium having a substrate, a sputtered chromium underlayer, a sputtered thin-film recording magnetic layer, a sputtered soft ferromagnetic film having a thickness between about 10–100 Å, and a sputtered carbon overcoat, said medium having an inner diameter edge and an outer diameter edge, means for rotating the medium, and a zero-bias read-write head, effective to read and write magnetic signals to the medium, when the head is positioned above the rotating medium, wherein said system is characterized by a high frequency signal amplitude, measured at a region adjacent said outer edge using a zero-bias read-write head operating at 18 MHz, that is greater than the high frequency signal amplitude of a medium having a substrate, a chromium underlayer, a magnetic recording layer and a carbon overcoat, but lacking said soft ferromagnetic film.

2. The system of claim 1, wherein said soft ferromagnetic film has a thickness between about 20–60 Å.

3. The system of claim 1, wherein said soft ferromagnetic film is composed of a nickel/iron alloy.

4. The system of claim 1, wherein said soft ferromagnetic film has a thickness of about 20–40 Å, and said magnetic recording medium is further characterized by one or more of the following:

(a) reduction in bit-shift, as measured by recording a ditbit pattern;

(b) increase in overwrite, as measured at two frequencies using a read-write analyzer; and (c) increase in DC-signal to noise ratio, taken as the ratio of peak-to-peak amplitude of a single pulse as a function of recording frequency to the recording noise at that frequency.

* * * * *